UNITED STATES PATENT OFFICE

2,493,597
USE OF PHOSPHITE ESTERS IN THE STABILIZATION OF LINEAR POLYAMIDES

David A. Rothrock, Jr., and Richard F. Conyne, Philadelphia, Pa., assignors to Rohm & Haas Company, Philadelphia, Pa., a corporation of Delaware No Drawing. Application March 5, 1946, Serial No. 652,238

8 Claims. (Cl. 260—45.7)

This invention relates to a process for the production of linear polyamides, which are stabilized against changes in viscosity and molecular weight usually caused by moisture, heat, light, and/or oxygen, and to the resulting product.

Linear polyamides, including the so-called "superpolyamides" are well-known and have found extensive use as surface coatings, drawn fibers, and the like. They are condensation products which may be made by a variety of methods, including condensing diamines with dicarboxylic acids or amide-forming derivatives of dicarboxylic acids, or by condensing aminocarboxylic acids or their amide-forming derivatives, or by condensing salts of diamines with dicarboxylic acids, at temperatures of the order of 200° to 300° C. Polyamides, having a wide variety of properties may be made by varying the reactants and the degrees of condensation.

All of the products, however, have the disadvantage of changing in viscosity and molecular weight when exposed intermittently or continuously for substantial periods of time to moisture, heat, light, and/or oxygen. For example, in many operations such as in the application of hot-melt coatings, in which the polyamide is held in the molten condition, it has been found that the polyamides degrade as heating continues. The changes appear to be due to both oxidation and hydrolysis, and result in a lowering of the viscosity and a change in other physical properties. Similar degradation of the polyamides occurs on ageing, particularly in light. Whatever the mechanism of degradation, the degraded polyamides are less useful than the original polyamides, and the degraded product often fails for its intended purpose.

On the other hand, some polyamides increase markedly in viscosity, and change in other physical properties, if they are maintained in the molten state in a dry, non-oxidizing atmosphere. Such a change is also undesirable and points to the need of stabilization of the polyamides against increases in viscosity and molecular weight as well as against degradation.

It is an object of this invention to stabilize polyamides so that they remain unchanged on ageing or on being subjected to conditions which would otherwise bring about change in their properties. This object is realized by preparing a polyamide having the degree of condensation desired in the final product, adding thereto a stabilizing agent and heating the resultant mixture until the polyamide and the stabilizing agent have reacted. The final heating is preferably performed at reduced pressure in an atmosphere of an inert gas. The mere addition of the stabilizing agent to the polyamide does not suffice to stabilize the polyamide. Nor is the stabilizing effect noted when the agent is mixed with the polyamide-forming reactants prior to their condensation. It is believed that the stabilizing agent reacts with the terminal groups of the polyamide and thereby prevents the terminal groups from oxidizing, hydrolyzing, or condensing. Regardless of theory, it is a fact that the stabilizing agents, when reacted in the amounts noted below with a condensed polyamide, prevent any substantial change in the degree of condensation or molecular weight of the polyamide.

The stabilizing agents employed in accordance with this invention are organic esters of phosphorous acid, including aryl phosphites, alkyl phosphites, aralkyl phosphites and cycloalkyl phosphites. These are typified by the following: tricresyl phosphite, triphenyl phosphite, trimethyl phosphite, triethyl phosphite, monoamyl phosphite, dibutyl phenyl phosphite, phenyl ethyl phosphite, trioctyl phosphite, diamyl phosphite, diphenoxyethyl phosphite, dicyclohexyl phosphites, and the corresponding thiophosphites.

The amount of stabilizing agent which is reacted with the linear polyamide is relatively small. Amounts from about 0.001 to about 0.07 mol of said stabilizing agent per kilogram of linear polyamide are not only adequate to effect stabilization but are also within such limits that excessive and undesirable changes in the nature of the final polymer do not develop. It is preferred that concentrations of 0.003 to 0.04 mol of phosphite per kilogram of linear polyamide be used.

As stated above, it is most important that the stabilizer be reacted with the linear polyamide. Since the addition of the stabilizer tends to reduce the rate of condensation of the polyamide, it is preferred that the agent be added to and reacted with the polyamide when the latter has reached approximately its required degree of condensation. The phosphite ester stabilizing agent is preferably reacted with the polyamide at the temperature at which the condensation has been conducted. Suitable temperatures are those above about 100° C. and preferably between about 180° C. and 300° C.

The following illustrative examples will assist in a better understanding of this invention.

A. Hexamethylene diammonium sebacate was prepared by reacting hexamethylene diamine and sebacic acid in equivalent amounts in denatured alcohol solution. The diamine was added dropwise to the dibasic acid solution and the diammonium salt precipitated immediately. Heat was evolved and the temperature rose to 40° C. The precipitated salt was filtered off, washed, and dried.

Into a glass liner for an autoclave was placed 50 grams of the diammonium salt and 5 grams of distilled water. The liner was sealed in a horizontal position in an Adkins bomb. The bomb was flushed with hydrogen, then filled with hydrogen to a pressure of 50 lbs./sq. in. The closed bomb was heated to 250°-260° C. and held at that temperature for four hours. The pressure rose to about 600 lbs./sq. in. and liquid distilled from the liner into the bomb. The bomb was cooled to room temperature and vented. The product, a cream-colored, brittle mass, had a melting point of 195°-205° C.

B. Two ten-gram portions of the product of A above were taken and to one portion only was added 0.02 gram of triphenyl phosphite as a stabilizer. The two portions were then separately heated for one hour at 240°-250° C. in an atmosphere of hydrogen. Suction was then applied and the portions of polyamide were further heated at a temperature of 240°-250° C. and under a pressure of 1-2 mm. for 17.5 hours. At the end of this time both portions of polyhexamethylene sebacamide thus prepared could be cold drawn. The intrinsic viscosity of the portion without stabilizer was 0.73 whereas, for the portion containing the triphenyl phosphite, it was 0.70.

C. Portions of the polyamides made as noted in Example B above were spread on watch glasses and heated in air for 15.5 hours at 125° C. At the end of this heating period the polyamide which did not contain stabilizer had degraded to a viscosity of 0.60 whereas the polyamide containing the stabilizer had an intrinsic viscosity of 0.72. Furthermore, the stabilized product was much the paler in color.

Another test of stability was made by separately heating portions of the two polyamides, prepared in accordance with Example B above, in distilled water at 60° C. for 15.5 hours. The polyamides were then dried by heating at 125° C. for one hour. The polyamide containing triphenyl phosphite remained substantially unchanged during the test and finished the test with a viscosity of 0.71. The polyamide containing no triphenyl phosphite degraded from a viscosity of 0.73 to 0.68.

Thus, by adding to and reacting with linear polyamide a phosphite ester in the amounts noted above, stabilized polyamides are produced which resist the changes otherwise caused by heat, light, oxygen, and/or water.

We claim:

1. A process for stabilizing a linear polyamide against changes caused by exposure to moisture, heat, light, and oxygen, which comprises reacting and chemically combining said polyamide, by heating at a temperature of 100° C. to 300° C., with from 0.001 to 0.07 mole, per kilogram of said polyamide, of a stabilizing agent comprising a monomeric ester of phosphorous acid, the organic radicals of which ester are monovalent hydrocarbon radicals free of non-benzenoid unsaturation, said linear polyamide being the product of condensing, at 200° C. to 300° C., polymerizable reactants which contain amino groups and carboxyl groups as the sole reactive groups and which are members of the class consisting of (a) diamines and dicarboxylic acids, (b) aminocarboxylic acids, and (c) dicarboxylic acids and salts of diamines.

2. A process for stabilizing a linear polyamide against changes caused by exposure to moisture, heat, light, and oxygen, which comprises reacting and chemically combining said polyamide, by heating at a temperature of 180° C. to 300° C., with from 0.003 to 0.04 mole, per kilogram of said polyamide, of a stabilizing agent comprising a monomeric ester of phosphorous acid, the organic radicals of which ester are monovalent hydrocarbon radicals free of non-benzenoid unsaturation, said linear polyamide being the product of condensing, at 200° C. to 300° C., polymerizable reactants which contain amino groups and carboxyl groups as the sole reactive groups and which are members of the class consisting of (a) diamines and dicarboxylic acids, (b) aminocarboxylic acids, and (c) dicarboxylic acids and salts of diamines.

3. As a new composition of matter characterized by stability on exposure to moisture, heat, light and oxygen, a linear polyamide which has been reacted and chemically combined by heating at a temperature of 100° C. to 300° C., with 0.001 to 0.07 mole, per kilogram of polyamide, of a stabilizing agent comprising a monomeric ester of phosphorous acid, the organic radicals of which ester are monovalent hydrocarbon radicals free of non-benzenoid unsaturation, said polyamide being the product of condensing, at 200° C. to 300° C., polymerizable reactants which contain amino groups and carboxyl groups as the sole reactive groups and which are members of the class consisting of (a) diamines and dicarboxylic acids, (b) aminocarboxylic acids, and (c) dicarboxylic acids and salts of diamines.

4. A process for stabilizing a linear polyamide against changes caused by exposure to moisture, heat, light, and oxygen, which comprises reacting and chemically combining said polyamide by heating it at a temperature from 180° C. to 300° C. with 0.001 to 0.07 mol, per kilogram of said polyamide, of triphenyl phosphite, said polyamide being the product of condensing, at 200° C. to 300° C., polymerizable reactants which contain amino groups and carboxyl groups as the sole reactive groups and which are members of the class consisting of (a) diamines and dicarboxylic acids, (b) aminocarboxylic acids, and (c) dicarboxylic acids and salts of diamines.

5. A process for stabilizing a linear polyamide against changes caused by exposure to moisture, heat, light, and oxygen, which comprises reacting and chemically combining said polyamide by heating it at a temperature from 180° C. to 300° C. with 0.003 to 0.04 mol, per kilogram of said polyamide, of triphenyl phosphite, said polyamide being the product of condensing, at 200° C. to 300° C., polymerizable reactants which contain amino groups and carboxyl groups as the sole reactive groups which are members of the class consisting of (a) diamines and dicarboxylic acids, (b) aminocarboxylic acids, and (c) dicarboxylic acids and salts of diamines.

6. A process of stabilizing polyhexamethylene sebacamide against changes due to moisture, heat, light, and oxygen, which comprises reacting and chemically combining said polyhexamethylene sebacamide by heating it at a temperature of 180° C. to 300° C., with 0.001 to 0.07 mol, per kilogram of said polyhexamethylene sebacamide, of a stabilizing agent comprising a monomeric ester of phosphorous acid, the organic radicals of which are monovalent hydrocarbon radicals free of non-benzenoid unsaturation.

7. A process of stabilizing polyhexamethylene sebacamide against changes due to moisture, heat, light, and oxygen, which comprises reacting and chemically combining said polyhexamethylene sebacamide with triphenyl phosphite in an amount from 0.003 to 0.04 mol per kilogram of polyhexamethylene sebacamide by heating at a temperature of 180° to 300° C.

8. A new composition of matter comprising the reaction product of heating and chemically combining at 180° C. to 300° C. polyhexamethylene sebacamide and triphenyl phosphite in an amount from 0.003 to 0.04 mol per kilogram of said polyhexamethylene sebacamide.

DAVID A. ROTHROCK, Jr.
RICHARD F. CONYNE.

REFERENCES CITED

The following references are of record in the file of this patent:

UNITED STATES PATENTS

| Number | Name | Date |
| --- | --- | --- |
| 2,153,511 | Cheetham et al. | Apr. 4, 1939 |
| 2,174,527 | Peterson | Oct. 3, 1939 |
| 2,309,729 | Gordon | Feb. 2, 1943 |